(12) United States Patent
Bäker et al.

(10) Patent No.: US 9,102,301 B1
(45) Date of Patent: Aug. 11, 2015

(54) SEATBELT CLAMPING DEVICE AND SYSTEM

(71) Applicant: Autoliv ASP, Inc., Ogden, UT (US)

(72) Inventors: Matthias Bäker, Hamburg (DE); Jonathon Boughner, Lake Orion, MI (US); Chris Koprowicz, Macomb, MI (US); Paul Heasman, Rochester Hills, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/298,147

(22) Filed: Jun. 6, 2014

(51) Int. Cl.
*A44B 11/25* (2006.01)
*B60R 22/26* (2006.01)

(52) U.S. Cl.
CPC ............... *B60R 22/26* (2013.01); *A44B 11/25* (2013.01)

(58) Field of Classification Search
CPC ........... A44B 11/2538; A44B 11/2561; A44B 11/2569; B60R 2022/1812; B60R 22/12; B60R 22/18; Y10T 24/4019; Y10T 24/45241; Y10T 24/45272; Y10T 24/4534
USPC ....................................................... 24/592.1
See application file for complete search history.

(56) References Cited

U.S. PATENT DOCUMENTS

| | | | | |
|---|---|---|---|---|
| 3,510,151 A | * | 5/1970 | Weman | 280/808 |
| 3,844,001 A | | 10/1974 | Holmberg | |
| 3,920,265 A | * | 11/1975 | Nilsson | 297/483 |
| 4,035,595 A | * | 7/1977 | Tolfsen | 200/61.58 B |
| 4,109,935 A | * | 8/1978 | Weman | 280/808 |
| 4,160,565 A | | 7/1979 | Matsumoto | |
| 4,445,709 A | * | 5/1984 | Bost | 280/801.1 |
| 6,224,105 B1 | * | 5/2001 | Lake | 280/801.1 |
| 6,502,861 B2 | * | 1/2003 | Specht | 280/808 |
| 7,114,590 B2 | * | 10/2006 | McFalls et al. | 180/268 |
| 7,387,315 B2 | * | 6/2008 | Nett et al. | 280/801.1 |
| 2012/0286501 A1 | * | 11/2012 | Goudeau et al. | 280/801.1 |
| 2013/0341994 A1 | | 12/2013 | Boughner et al. | |

* cited by examiner

*Primary Examiner* — Robert J Sandy
*Assistant Examiner* — David Upchurch
(74) *Attorney, Agent, or Firm* — Brinks Gilson & Lione

(57) ABSTRACT

A seatbelt clamping device includes a U shaped housing configured for being mounted to vehicle structure and a shackle that is pivotally attached to the housing. The shackle can pivot between an open position for receiving a loop of seatbelt webbing and a closed position for retaining the seatbelt webbing. The housing includes a locking surface, and the shackle and locking surface define a gap therebetween through which the seatbelt webbing can slide. The shackle includes a shaft and a cam cover rotatable about the shaft. The cam cover includes an increased radius locking portion that can rotate toward the locking surface to clamp the seatbelt webbing in response to a load exerted thereon.

19 Claims, 4 Drawing Sheets

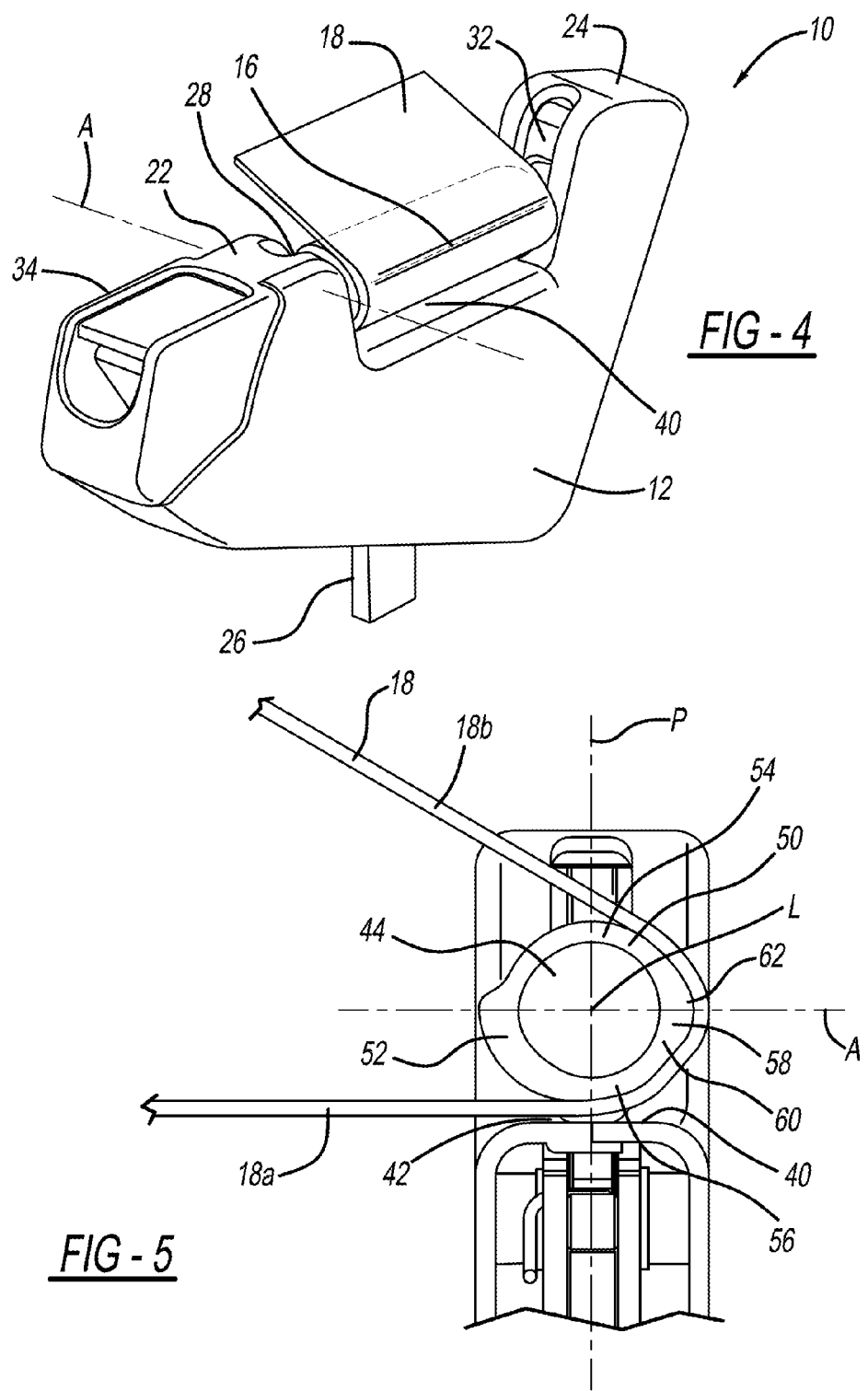

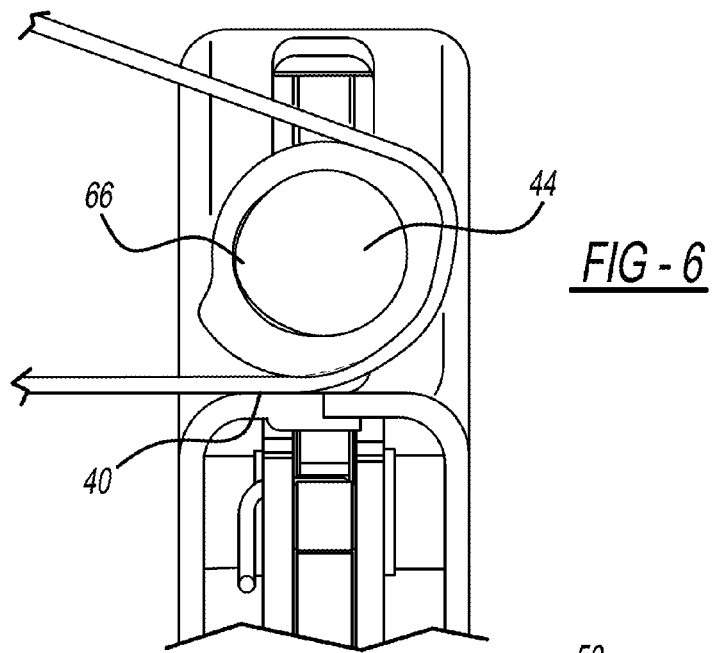
*FIG - 6*
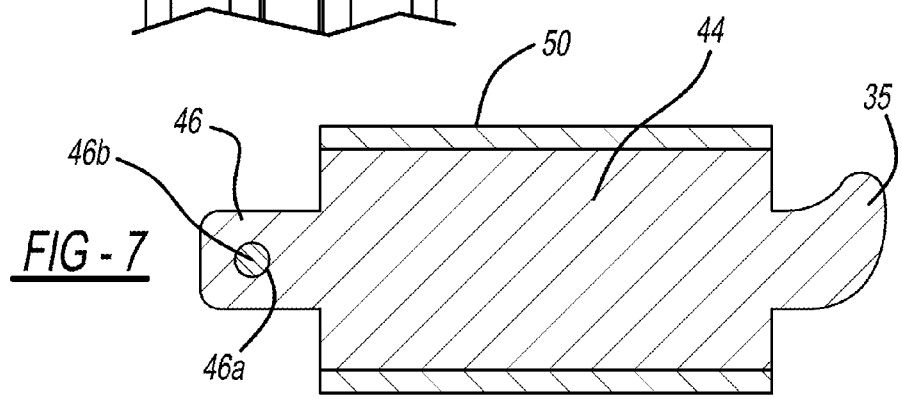
*FIG - 7*
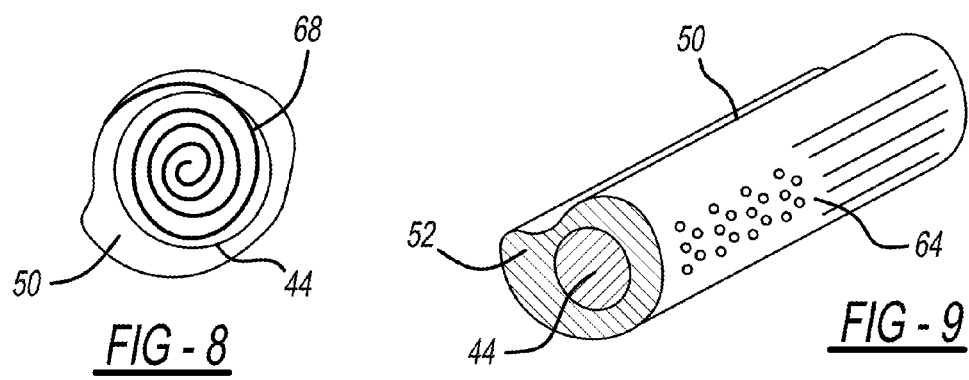
*FIG - 8*
*FIG - 9*

SEATBELT CLAMPING DEVICE AND SYSTEM

FIELD OF THE INVENTION

This invention relates to a seatbelt clamping device adapted for use as part of a motor vehicle occupant restraint system.

BACKGROUND OF THE INVENTION

Seatbelt assemblies and systems are in widespread use in motor vehicles. Present systems have certain common elements including seatbelt webbing which extends across the upper and lower torso of the occupant, and a retractor for allowing protraction and retraction of the webbing so that the belt may adapt to different sizes of occupants and be conveniently out of the way when not being used. Seatbelt assemblies further typically include a buckle which releasably attaches to a latch plate.

Seatbelt assemblies must be securely affixed to motor vehicle structural elements in order to provide the necessary restraint effect in vehicle impact conditions and further to meet government regulations. Further, seatbelt assemblies must securely retain an occupant within its seat, while also allowing the occupant easy ingress and egress from the seat under a variety of conditions and situations.

Typical seatbelt assemblies include a buckle that is securely mounted to a vehicle structure, such as a seat frame or the floor of the occupant compartment. The buckle typically includes a slot that is sized to receive and retain a latch plate.

The latch plate is typically attached to the seatbelt webbing. The seatbelt webbing is typically fixed to the vehicle structure at one end, and the opposite end is typically fixed to a retractor in the form of a spool that is configured to protract and retract the webbing in response to various loads. The latch plate is typically attached by passing the seatbelt webbing through an elongate opening or slot, such that the latch plate can slide along the webbing and be adjusted relative to the size of the occupant. The latch plate is typically attached to webbing such that the latch plate remains on the webbing, whether the seatbelt is in the buckled or unbuckled configuration.

One type of latch plate includes a simple elongate opening, such that the webbing will freely slide through the opening without substantial restriction from adjustment. Pulling on either end of the webbing by the occupant relative to the latch plate will allow the webbing to be adjusted. However, in the event of a rapid deceleration of the vehicle, the webbing is likewise free to travel through the opening in response to movement of the occupant. Some present systems include latch plates that will pinch the webbing at the latch plate when significant load is applied.

Another type of latch plate includes a housing, through which the webbing can pass. The housing includes a translatable lock bar that can slide along the housing. By sliding the lock bar, the webbing can be locked in place, thereby preventing the webbing from moving relative to the latch plate. However, this approach makes it difficult to adjust the webbing for the occupant.

Another type of seatbelt system can include two retractors, where one retractor is attached at the top of a shoulder belt portion of the seatbelt, and the other is attached at the end of a lap belt portion. The shoulder belt portion and lap belt portion are each stitched to a latch plate that is received by a traditional buckle. In this system, the belt portions do not move relative to the latch plate. However, this system is expensive because it requires two retractors.

A seatbelt clamping device in accordance with this invention provides the advantage of avoiding the need for a latch plate, saving cost and weight. The invention also provides for greater ease of use, making it easier to find and attach the belt by grabbing the seatbelt webbing without having to locate and adjust the latch plate.

Additional benefits and advantages of the present invention will become apparent to those skilled in the art to which the present invention relates from the subsequent description of the preferred embodiment and the appended claims, taken in conjunction with the accompanying drawings.

SUMMARY

A vehicle restraint system is provided that uses a clamping device and a seatbelt, where the clamping device retains the seatbelt. The clamping device includes a cam cover that is rotatable in response to a load exerted on the seatbelt. Rotation of the cam cover causes the seatbelt to become clamped between a locking surface and the cam cover.

A clamping device for retaining a seatbelt for use in a passenger vehicle is provided. The device includes a housing adapted for mounting to a vehicle structure, the housing defining a locking surface on an external surface thereof. The device further includes a shackle attached to the housing and having an elongate shape defining a longitudinal axis, an inboard side disposed toward a passenger and an outboard side disposed away from the passenger. The shackle includes a cam cover having a cross-section transverse to the longitudinal axis having a non-circular perimeter and the cam cover is rotatable about the longitudinal axis. The cam cover has a nominal position and a rotated position that is rotated about the longitudinal axis relative to the nominal position. In the nominal position, the cam cover defines a gap between the locking surface and the cam cover, where a seatbelt can travel through the gap, and when in the rotated position, the cam cover reduces the gap to limit seatbelt travel therethrough due to clamping between the cam cover and the locking surface.

In another aspect, a restraint assembly adapted for being attached to vehicle structure for retaining a seatbelt is provided. The assembly includes a clamping device that includes a housing having a U shape and defining an upwardly extending front arm, and an upwardly extending rear arm and a locking surface extending between the front arm and the rear arm. The device further includes a shackle including an elongate shaft defining a longitudinal axis and a cam cover surrounding the elongate shaft and being rotatable about the shaft, the shackle being pivotally attached to the housing. The cam cover includes a locking portion protruding from a first lateral side and gripping portion disposed on the opposite lateral side. The shackle has an open position where the shackle is pivoted upward for receiving a seatbelt webbing therearound to be disposed against the gripping portion, and the shackle further has a closed position for retaining the seatbelt. The seatbelt is retained between the shackle, the locking surface of the housing, the front arm, and the rear arm. The cam cover has a nominal position and a rotated position that is rotated about the longitudinal axis of the elongate shaft relative to the nominal position. The cam cover defines a gap between the locking surface and the cam cover when the cam cover is in the nominal position, where a seatbelt can slide through the gap, and where the cam cover clamps the seatbelt webbing between the cam cover and the locking surface of the housing when the cam cover is in the rotated position and also pivoted into the closed position.

In another aspect, an occupant restraint system is provided that includes a seatbelt and a clamping device as described above. The seatbelt has a first end attached to vehicle structure and a second end attached to a seatbelt retractor. The seatbelt has a first point of attachment at the first end of the seatbelt, a second point of attachment at the second end of the seatbelt, and a third point of attachment at the clamping device when the shackle is in the closed position.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWINGS

FIG. 4 is an isometric view of the clamping device, showing the seatbelt webbing being clamped by the device and restricted from sliding;

FIG. 5 is a cross-sectional view of the clamping device in the closed position, with a cam cover of the clamping device in a nominal position allowing seatbelt webbing to slide through a gap between the shackle and a locking surface of the housing;

FIG. 6 is a cross-section view of the clamping device in the closed position, with the cam cover being in a rotated position to clamp the webbing and prevent it from sliding between the shackle and the locking surface;

FIG. 7 is a cross-sectional view of the shackle illustrating a front flange and a rear locking portion;

FIG. 8 is an isometric view of the shackle showing a roughened surface; and

FIG. 9 is a cross-sectional view showing a torsion spring connected to the cam cover and a shaft.

DETAILED DESCRIPTION OF THE INVENTION

Figure 1:
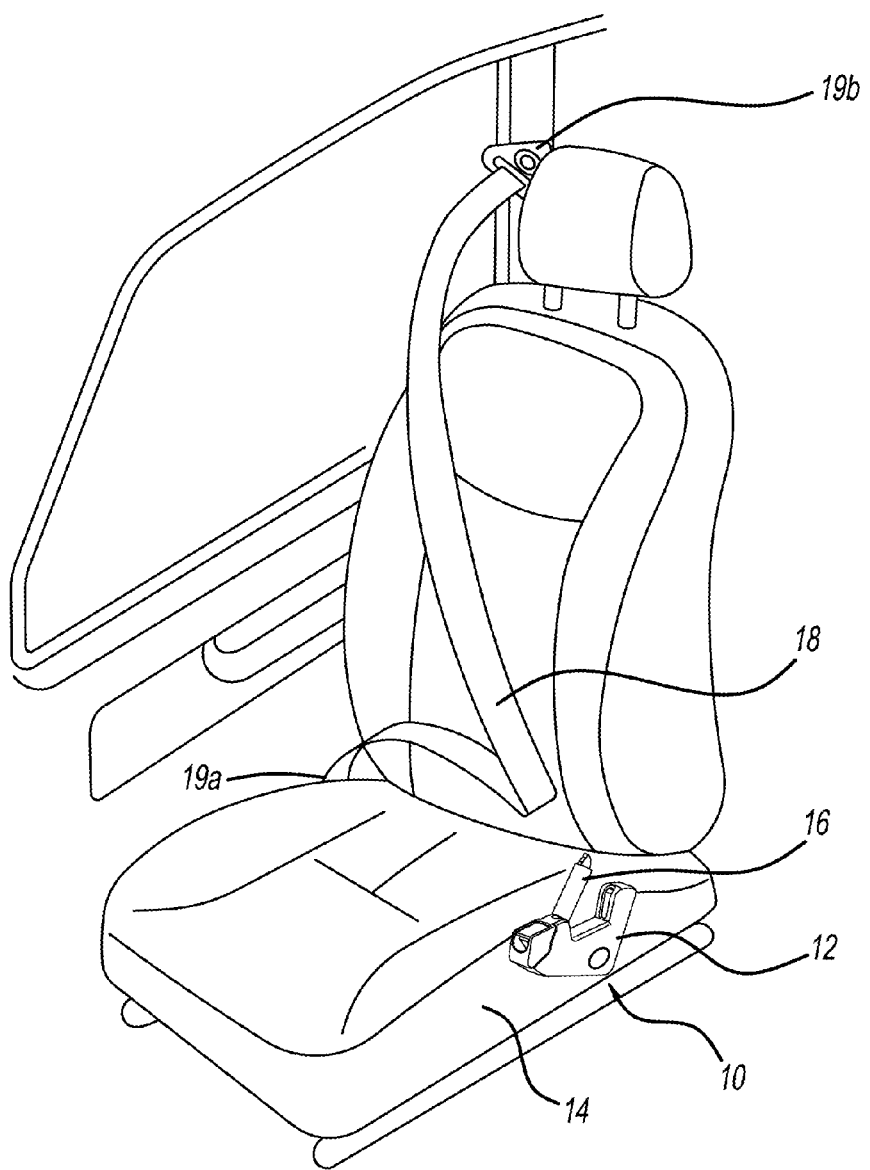
FIG. 1 is an isometric view of an occupant restraint system having a seatbelt clamping device attached to vehicle structure and seatbelt webbing for being retained by the clamping device.

An occupant restraint system having a seatbelt clamping device 10 in accordance with various embodiments of this invention is illustrated in FIGS. 1-9. The device 10 includes a housing 12 adapted for mounting to a vehicle structure 14 and a shackle 16 attached to the housing 12. The shackle 16 has an elongate shape and is pivotally attached to the housing 12 such that it can be pivoted into and out of a closed position to allow a seatbelt webbing 18 of the system 9 to be retained by the device 10.

In one approach, the belt webbing 18 has a fixed anchor 19a at its lower end and a retractor 19b at its upper end. The retractor 19b may or may not have a pre-tensioner function. Thus, the belt webbing 18 has three points of connection to the vehicle: at the ends of the belt webbing 18 and at the device 10 when the device 10 is in the closed position and retaining the webbing 18.

With reference to FIGS. 2-5, the housing 12 has a generally upward facing U-shape. The housing 12 includes a main body portion 20, with the main body portion 20 defining a front arm 22 and a rear arm 24. The main body portion 20 has a generally flat profile that extends in the fore-and-aft direction of the vehicle when mounted thereto. The housing 12 is mounted to the vehicle structure 14 via a mounting extension 26 that extends from the bottom of the housing 12 to the vehicle structure 14 for mounting thereto in a manner known in the art. In another approach, the housing 12 is mounted to the vehicle structure 14 without the use of an extension, such as being mounted to a seat base. The housing 12 further defines a fore-and-aft plane P (FIG. 5) that extends in the fore-and-aft direction and bisects the housing 12. Of course, it will be appreciated that the housing 12 can have other shapes to correspond to other vehicle structure types or available space.

The front arm 22 includes a pivotal connection 28 where the shackle 16 can be pivotally attached. Preferably, the shackle 16 is pivotally attached such that it can pivot up and down along the fore-and-aft plane P about a pivotal axis A defined by the pivotal connection 28. The pivotal axis A is generally transverse, in one form being perpendicular, to the fore-and-aft plane P.

The rear arm 24 includes a retaining slot 30 located at the fore-and-aft plane P. The retaining slot 30 is configured to receive the end of the shackle 16 opposite the pivotal connection 28, such that the shackle 16 can be pivotally locked in place and retained by the housing 12 in the closed position. The shackle 16 is locked in place by a releasable retaining connection 32 that is configured to allow the shackle 16 to be inserted into the connection 32 in a downward direction while preventing the shackle 16 from being released in an upward direction.

The front arm 22 further includes a release button 34 that is mechanically coupled to the retaining connection 32 by way of connections internal to the housing 12 in a manner known in the art. Depressing the button 34 will result in the retaining connection 32 releasing the shackle 16 therefrom, allowing the shackle 16 to pivot upward into the open position. More specifically, the restraining connection 32 includes an internal mechanism that engages a rear latch 35 extending from the shackle 16. Depressing the button 34 will cause the mechanism to release the latch 35. In another approach, the release of the latch 35 can be accomplished in other manners known in the art, such as through the use of an electrical actuation, solenoid actuation, magnetic actuation, or the like. The shackle 16 includes a torsion spring (not shown) attached thereto to bias the shackle 16 to pivot upward toward the open position. In another approach, the internal mechanism could use an over-center approach to bias the shackle 16 toward the open position, or the shackle 16 could be moved upward via a motor or other electrical or mechanical mechanism capable of pivoting the shackle 16 upward when released from the connection 32 in response to actuation by an occupant, or automatically.

In an alternative arrangement, the pivotal connection 28 could be disposed at the rear arm 24, with the retaining connection 32 being disposed at the front arm 22, such that the shackle 16 will pivot about the rear arm 24 and be open in the forward direction when in the open position.

Figure 2:
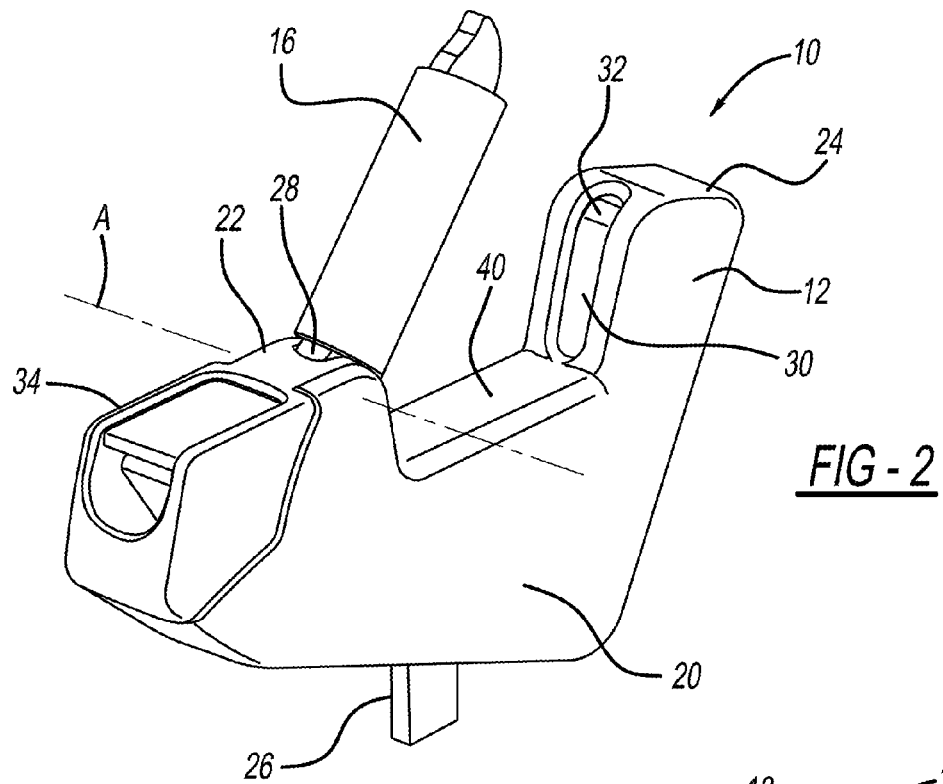
FIG. 2 is an isometric view of the clamping device illustrating a housing and a shackle, with the shackle in an open position.
Figure 3:
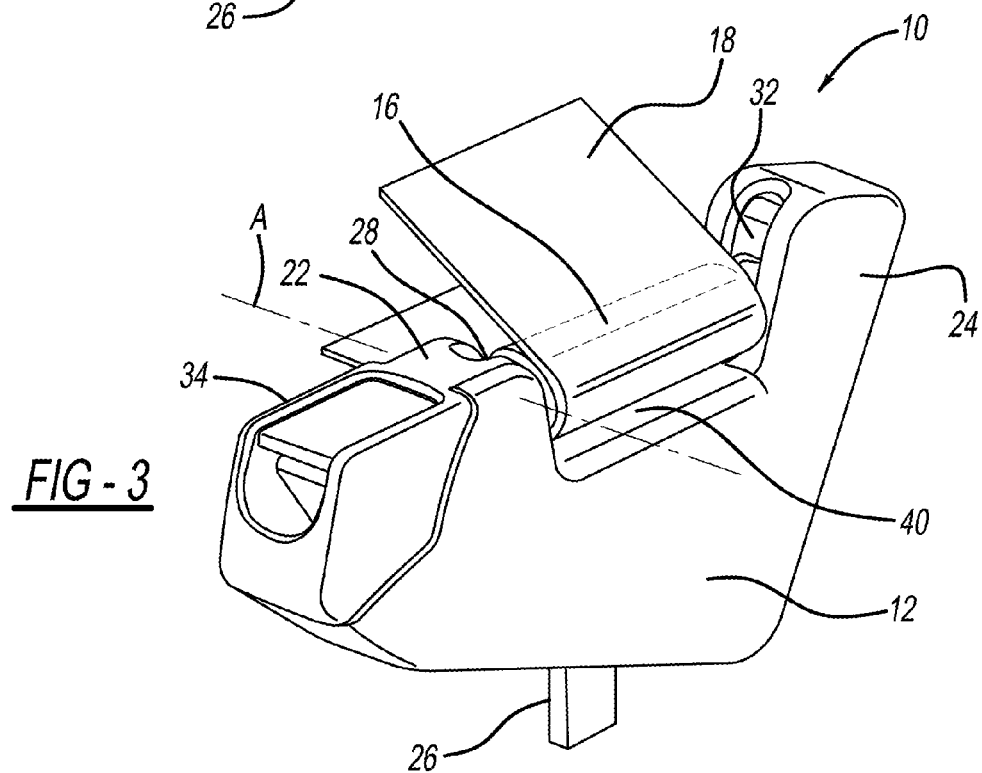
FIG. 3 is an isometric view of the clamping device showing the shackle in a closed position with the seatbelt being free to slide through the device.

When the shackle 16 is in an open position, shown in FIGS. 1 and 2, the seatbelt webbing 18 can be looped around the shackle 16 such that the seatbelt webbing 18 takes the form of a traditional lap belt portion 18a and a shoulder belt portion 18b when the shackle 16 is in a closed position, shown in FIGS. 3-6. Pivoting the shackle 16 into its closed position will retain the seatbelt webbing 18 in this position to retain the vehicle occupant in the vehicle seat.

The housing 12 further defines a locking surface 40, shown in FIGS. 2-6, that extends in the fore-and-aft direction between the arms 22 and 24. When the shackle 16 is in the buckled position the shackle 16 and the locking surface will define a gap 42 therebetween, shown in FIG. 5, and the seatbelt webbing 18 will extend through the gap 42 between the locking surface 40 and the shackle 16. As will be further described below, the webbing 18 will slide through the gap 42 under low load conditions, and in response to a relatively higher tension load from the seatbelt webbing 18, such as in a collision or rapid deceleration, the shackle 16 and locking surface 40 will combine to reduce the size of the gap 42 to clamp the seatbelt webbing 18 in place.

The locking surface 40 is shown as a generally flat surface. However, it will be appreciated that other surface shapes could be used. For example, the locking surface 40 could have generally upward facing concave shape. In another aspect, the locking surface 40 could have a convex shape. A concave shape may increase the surface area for clamping and distribute the clamping force further across the surface, while a convex surface would increase the clamping force at a more concentrated area. Either approach, or the flat surface approach, could be used as desired. It will be appreciated that other shapes of the locking surface 40 could also be used, such as a ridged surface, dimpled surface, roughened surface, or the like.

With reference to FIGS. 5 and 6, the shackle 16 is shown in a cross-sectional view. The shackle 16 has a generally elongate shape and defines a longitudinal axis L, with the cross-section being taken in a plane transverse to the axis L such that the axis L extends into and out of FIGS. 5 and 6. FIG. 5 shows the shackle 16 in the closed position, with the webbing 18 extending through the gap 42 and being generally free to slide through the gap to accommodate adjustment by the occupant.

The shackle 16 is in the form of a central shaft 44 that has a generally solid cross-section; however, in another approach, the shaft 44 could have a hollow construction with or without a support structure spanning the shaft 44. The central shaft 44 is the portion of the shackle 16 that pivotally connects to the pivotal connection 28 of the housing 12. The central shaft 44 includes a front flange 46, shown in FIG. 7, that pivotally connects to the pivotal connection 28, and further includes the rear latch 35 that is received by the retaining connection 32. The front flange 46 includes a hole 46a through which a bar 46b extends. The bar 46b is mounted within the housing 12 and defines the pivotal axis P about which the shackle 16 can pivot between the closed position and the open position. Of course, other manners of connecting the shackle 16 to the housing 12 could also be used that allow the shackle 16 to pivot between an open and closed position.

The front flange 46 and rear latch 35 are integrally formed with the shaft 44 to define a monolithic structure in one approach. In another approach, the front flange 46 and rear latch 48 can be separate components that are connected to the shaft 44 via adhesive, welding, mechanical connection, or the like. It will be appreciated that if the pivotal connection 28 is at the rear of the housing 12, that the flange 46 would likewise be at the rear and the latch 35 would be at the front to be received by the retainer connection 32 that is disposed at the front.

With reference to FIGS. 5-7, the shackle 16 further includes a cam cover 50 that surrounds the shaft 44. The cam cover 50 is separate from the shaft 44 such that the cam cover 50 rotates about the shaft 44 in response to a load from the belt webbing 18 exerted thereon. Accordingly, the cam cover 50 has a nominal position, shown in FIG. 5, where little to no significant belt load is exerted thereon, and further includes a rotated position, shown in FIG. 6, in response to a load from the belt webbing 18. The rotated position is around to the longitudinal axis L of the shackle 16, and is distinct from the ability of the shackle 16 to pivot up and down about the pivotal connection 28 between the open and closed positions. References to the shape of the cam cover 50 generally refer to the cam cover 50 when it is in the nominal position and the shackle 16 is in the closed position.

The cam cover 50 has a cross-section with a non-circular perimeter. In one approach, the cam cover 50 includes a locking portion 52 on an inboard side thereof, where the inboard side is the side directed toward the occupant that is restrained by the system 9. The locking portion 52 has a greater radius than an upper portion 54 and lower portion 56 of the cam cover 50. The radius of the locking portion 52 gradually increases from the bottom of the cam cover 50 up along the inboard side, such that an outer peripheral surface of the cam cover 50 has a curved profile.

The enlarged radius of the locking portion 52 allows the shackle 16 to clamp the webbing 18 when the cam cover 50 rotates in response to a load, as shown in FIG. 6. The locking portion 52 will rotate toward the locking surface 40 in response to a rotational load on the cam cover 50. When the locking portion 52 rotates toward the locking surface 40, the gap 42 will decrease due to the enlarged size of the locking portion rotating into that space. As the gap 42 decreases, the webbing 18 disposed therein will become compressed and clamped between the locking portion 52 and the locking surface 40.

As described briefly above, the cam cover 50 will rotate in response to a load. The load can arise in response to a collision or other rapid deceleration of the vehicle that would cause an occupant in the seat to accelerate forward against the shoulder portion 18b of the seatbelt webbing 18. It will be appreciated that references to an occupant accelerating forward are relative to the vehicle, as the occupant is decelerating at a slower rate than the vehicle. In situations such as these, the seatbelt webbing 18 will generally become locked by a seatbelt pretensioner, inertia lock, or a belt anchorage at the upper end of the seatbelt 18, as known in the art. The load exerted on the shoulder portion 18b will tend to cause the shoulder portion 18b to be pulled forward along with the occupant's torso. This load on the shoulder portion 18b will transfer to the webbing 18 at the location of the shackle 16, causing the shoulder portion 18b to be pulled upward relative to the shackle 16.

The frictional force caused by the tension in the webbing 18b will be transferred to the shackle 16 and the cam cover 50, in turn causing the cam cover 50 to rotate in the of the tension on the webbing 18. More particularly, this frictional force is produced by tension in the webbing 18 caused by the occupant's acceleration against the webbing 18. The webbing 18 is generally prevented from unspooling by inertia locks, pretensioners, torsion bars, and the like, as is known in the art. The force of the occupant's acceleration acts on the webbing 18. This tension in the webbing 18 is transferred to the cam cover 50 in the form of a frictional force, and increased tension in the shoulder portion 18b causes the cam cover 50 to rotate in the direction of a tension force from the shoulder portion 18b.

The cam cover 50 further includes a belt gripping portion 58 disposed on the outboard side thereof. The belt gripping portion 58 is therefore disposed on a diametrically opposite side of the cam cover 50 from the locking portion 52. The belt gripping portion 58 is configured to increase the frictional force on the cam cover 50 to increase its ability to rotate in response to the upward load caused by the tension in the webbing 18.

In one approach, the belt gripping portion 58 is in the form a protrusion 60. The protrusion 60 can have an increased thickness relative to the upper portion 54 and lower portion 56 of the cam cover 50. The protrusion can have a generally triangular shape with an outboard point 62. This point 62 will increase the frictional force exerted on the cam cover 50 in response to the load, thereby improving the ability of the cam cover 50 to rotate in response to the load. Further, this shape creates a lower surface 63a and an upper surface 63b, and increased tension in the belt portion 18b will thereby pull the lower surface 63a upward, causing the cam cover 50 to rotate.

With reference to FIG. 8, additionally, or alternatively, the belt gripping portion 58 can be in the form of a roughened surface 64. The roughened surface 64 can take the place of the protrusion 60, or the protrusion 60 itself can be roughened. In one approach, the roughened surface 64 is in the form of a dimpled surface, such as a plurality of concave depressions or convex protrusions, or a combination of both. Additionally, or alternatively, the roughened surface can be in the form of scoring, or a plurality of longitudinal ridges or depressions. It will be appreciated that other forms of roughening could also be used.

In another approach, the cam cover 50 could be made to rotate by an electric motor (not shown) in addition to or as an alternative to the belt gripping portion 58. In this approach, the motor could be operatively connected to a control unit of the vehicle. In response to detecting a collision of rapid acceleration, the control unit will send a signal to the motor, causing it to rotate the cam cover 50 to lock the webbing 18. The motor could be a separate component coupled to the cam cover 50. In another aspect, the cam cover 50 and shaft 44 could operate in a rotor/stator arrangement.

In another aspect, the shaft 44 has a non-circular cross-section. In this approach, the shaft 44 has a slightly enlarged radius 66 on one side, such as the inboard side or outboard side. The cam cover 50 has a corresponding shape on its inner surface. In the nominal position, the inner surface of the cam cover 50 and the outer surface of the shaft 44 will be aligned. Upon rotation of the cam cover 50 toward the rotated and locked position shown in FIG. 6, the inner surface of the cam cover 50 will have a slight interference with the enlarged radius 66 of the shaft 44. This interference can result in further locking of the cam cover 50 relative to the shaft 44, limiting the cam cover 50 from rotating back toward its nominal position after being rotated. Other manners of the holding the cam cover 50 in pace after rotating could also be used, such as through the use of threading between the shaft 44 and the cam cover 50 where the threading has non-uniform spacing. It will be appreciated further approaches that bind the shaft 44 and cam cover 50 after the cam cover 50 has rotated about the shaft 44 could also be used.

In another approach, the cam cover 50 and shaft 44 can have a torsion spring 68, shown in FIG. 9, connecting the two devices. The torsion spring 68 can be used to bias the cam cover 50 to the nominal position to thereby provide a centering function. For example, if desired, the torsion spring 68 could bias the cam cover 50 toward the nominal position, so that after rotating to the clamp the webbing 18 in response to the tension load from the webbing, and when the load has decreased, the cam cover 50 will rotate back to its nominal position. Similarly, if the cam cover 50 becomes rotated prior to a load being exerted for which belt clamping is desired, the spring 68 can orient the cam cover 50 back to its nominal position so that the above described clamping function can occur in response to loading.

To use the device 10, the shackle 16 is placed in its open position, shown in FIGS. 1 and 2. The occupant can grasp the seatbelt webbing 18 at essentially any location, without being required to locate a latch plate, and loop the webbing 18 over the upwardly extending shackle 16. The shackle 16 can then be pivoted toward the retaining connection 32 and into the closed position, shown in FIGS. 3 and 5, where the retaining connection 32 will retain the shackle 16 in the closed position.

Nominal pulling on the belt webbing 18 will allow the webbing 18 to be adjusted to suit the needs and comfort of the occupant. The shackle 16 and cam cover 50 will generally remain in the nominal position shown in FIGS. 3 and 5 because the nominal loads exerted by the occupant in the adjusting the webbing 18 remain below a threshold level for causing the cam cover 50 to rotate.

When the occupant desires that seatbelt be released, the button 34 of the housing 12 can be depressed, which will release the rear end of the shackle 16 from the retaining connection 32. The webbing 18 will thereby be free to be removed from its looping around the shackle 16. If the button 34 is not pressed, the webbing 18 will remain contained by the device 10, below the shackle 16, above the locking surface 40, and between the front arm 22 and rear arm 24. As mentioned above, other approaches to releasing the shackle 16 from its closed position could also be used.

In the event of a collision or rapid deceleration, the cam cover 50 will rotate into its rotated position in response to tension load from the webbing 18 (or a control signal sent to a motor, or the like) as described above and shown in FIGS. 4 and 6, and the belt webbing 18 will become clamped between the cam cover 50 and the locking surface 40. When the loading condition has ceased, the cam cover 50 may return to its nominal state or remain in its locked position, depending on the particular embodiment of the device 10. In either case, the occupant can depress the button 32 to release the shackle 16 from the retaining connection 32, allowing it to pivot upward, or the shackle 16 can be released or pivoted upward in response to an alternative actuation or automatically, if desired.

While the above description constitutes the preferred embodiment of the present invention, it will be appreciated that the invention is susceptible to modification, variation and change without departing from the proper scope and fair meaning of the accompanying claims.

The invention claimed is:

1. A clamping device for retaining a seatbelt for use in a passenger vehicle, the device comprising:
   a housing adapted for mounting to a vehicle structure, the housing defining a locking surface on an external surface thereof;
   a shackle attached to the housing and having an elongate shape defining a longitudinal axis;
   wherein the shackle includes a cam cover having a cross-section transverse to the longitudinal axis having a non-circular perimeter and the cam cover is rotatable about the longitudinal axis, wherein the shackle is pivotally attached to the housing at a first end, wherein the shackle is pivotable between an open position and a closed position and the shackle pivots about a pivot axis that is transverse to the longitudinal axis of the shackle;
   wherein the cam cover has a nominal position and a rotated position that is rotated about the longitudinal axis relative to the nominal position;
   wherein, when in the nominal position, the cam cover defines a gap between the locking surface and the cam cover, where the seatbelt can travel through the gap, and when in the rotated position, the cam cover reduces the gap to limit seatbelt travel therethrough due to clamping between the cam cover and the locking surface.

2. The device of claim 1, wherein the cam cover rotates to the rotated position in response to a tension load exerted on the seatbelt.

3. The device of claim 1, wherein the cam cover rotates to the rotated position via a motor to reduce the gap and limit the seatbelt travel therethrough.

4. The device of claim 1, wherein the cam cover includes a locking portion on an inboard side, where the locking portion rotates toward the locking surface when the cam cover rotates from the nominal position to the rotated position.

5. The device of claim 1, wherein the cam cover includes a belt gripping portion on an outboard side, where the belt gripping portion rotates away from the locking surface when the cam cover rotates from the nominal position to the rotated position.

6. The device of claim 5, wherein the belt gripping portion has a triangular shape.

7. The device of claim 5, wherein the belt gripping portion has a curved shape.

8. The device of claim 5, wherein the belt gripping portion includes a plurality of longitudinal grooves.

9. The device of claim 5, wherein the belt gripping portion includes a roughened surface.

10. The device of claim 4, wherein the locking portion has an increasing radius from the bottom of the cam cover upward along the inboard side when the cam cover is in the nominal position.

11. The device of claim 1, wherein the shackle is releasably attached to the housing at a second end.

12. The device of claim 1, wherein the shackle includes an elongate shaft extending through the cam cover along the longitudinal axis, wherein the cam cover rotates about the elongate shaft and the elongate shaft remains rotatably fixed.

13. The device of claim 12, wherein the elongate shaft has a non-circular cross-section and the cam cover has an internal surface corresponding to the cross-section of the elongate shaft.

14. The device of claim 13, wherein rotation of the cam cover about the longitudinal axis relative to the shaft causes the cam cover to lock relative to the shaft based on an interference of the internal surface of the cam cover and the non-circular cross-section of the shaft.

15. The device of claim 1, wherein the cam cover is biased toward the nominal position.

16. A vehicle restraint assembly adapted for being attached to vehicle structure for retaining a seatbelt, the assembly including a clamping device comprising:
  a housing having a U shape and defining an upwardly extending front arm, and an upwardly extending rear arm and a locking surface extending between the front arm and the rear arm;
  a shackle including an elongate shaft defining a longitudinal axis and a cam cover surrounding the elongate shaft and being rotatable about the shaft, the shackle being pivotally attached to the housing;
  wherein the cam cover includes a locking portion protruding from a first lateral side and gripping portion disposed on the opposite lateral side;
  wherein the shackle has an open position where the shackle is pivoted upward for receiving a seatbelt webbing therearound to be disposed against the gripping portion, and the shackle further has a closed position for retaining the seatbelt;
  wherein the seatbelt is retained between the shackle, the locking surface of the housing, the front arm, and the rear arm when the shackle is in the closed position;
  wherein the cam cover has a nominal position and a rotated position that is rotated about the longitudinal axis of the elongate shaft relative to the nominal position;
  wherein the cam cover defines a gap between the locking surface and the cam cover when the cam cover is in the nominal position, where a seatbelt can slide through the gap, and where the cam cover clamps the seatbelt webbing between the cam cover and the locking surface of the housing when the cam cover is in the rotated position and also pivoted into the closed position.

17. The assembly of claim 16 further comprising a pivotal connection between the housing and a first end of the shackle about which the shackle can pivot open and closed, and a releasable retainer connection for receiving a second end of the shackle when the shackle is pivoted closed.

18. The assembly of claim 17, wherein the retainer connection is disposed at the rear arm and the pivotal connection is disposed at the front arm.

19. A vehicle restraint system comprising:
  a seatbelt having a first end attached to a vehicle structure and a second end attached to a seatbelt retractor;
  a clamping device for clamping a portion of the seatbelt, the device comprising:
    a housing having a U shape and defining an upwardly extending front arm, and an upwardly extending rear arm and a locking surface extending between the front arm and the rear arm;
    a shackle including an elongate shaft defining a longitudinal axis and a cam cover surrounding the elongate shaft and being rotatable about the shaft, the shackle being pivotally attached to the housing;
    wherein the cam cover includes a locking portion protruding from a first lateral side and gripping portion disposed on the opposite lateral side;
    wherein the shackle has an open position where the shackle is pivoted upward for receiving a seatbelt webbing therearound to be disposed against the gripping portion, and the shackle further has a closed position for retaining the seatbelt;
  wherein the seatbelt is retained between the shackle, the locking surface of the housing, the front arm, and the rear arm when the shackle is in the closed position;
  wherein the cam cover has a nominal position and a rotated position that is rotated about the longitudinal axis of the elongate shaft relative to the nominal position;
  wherein the cam cover defines a gap between the locking surface and the cam cover when the cam cover is in the nominal position, where a seatbelt can slide through the gap, and where the cam cover clamps the seatbelt webbing between the cam cover and the locking surface of the housing when the cam cover is in the rotated position and also pivoted into the closed position;
  wherein the seatbelt has a first point of attachment at the first end of the seatbelt, a second point of attachment at the second end of the seatbelt, and a third point of attachment at the clamping device when the shackle is in the closed position.

* * * * *